Figure 1:
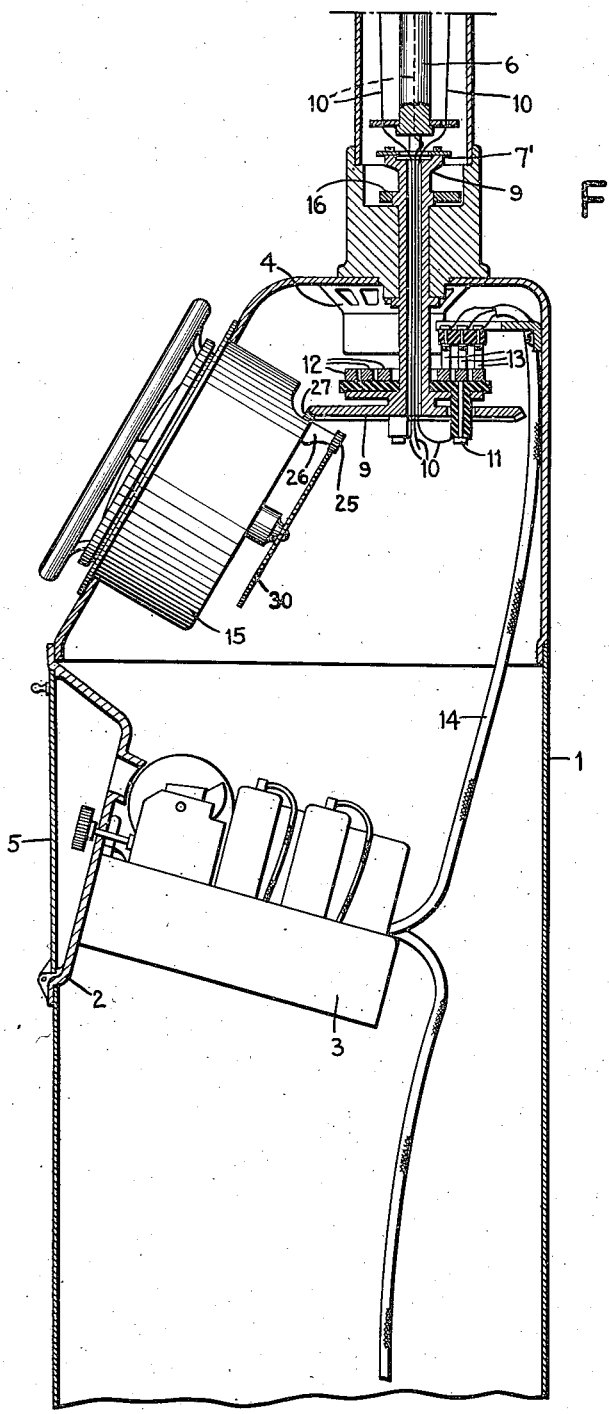

Aug. 1, 1939.  S. R. WAGNER  2,167,787
RADIO DIRECTION FINDER
Filed June 15, 1937   4 Sheets-Sheet 1

INVENTOR
STEPHAN R. WAGNER
BY
ATTORNEY

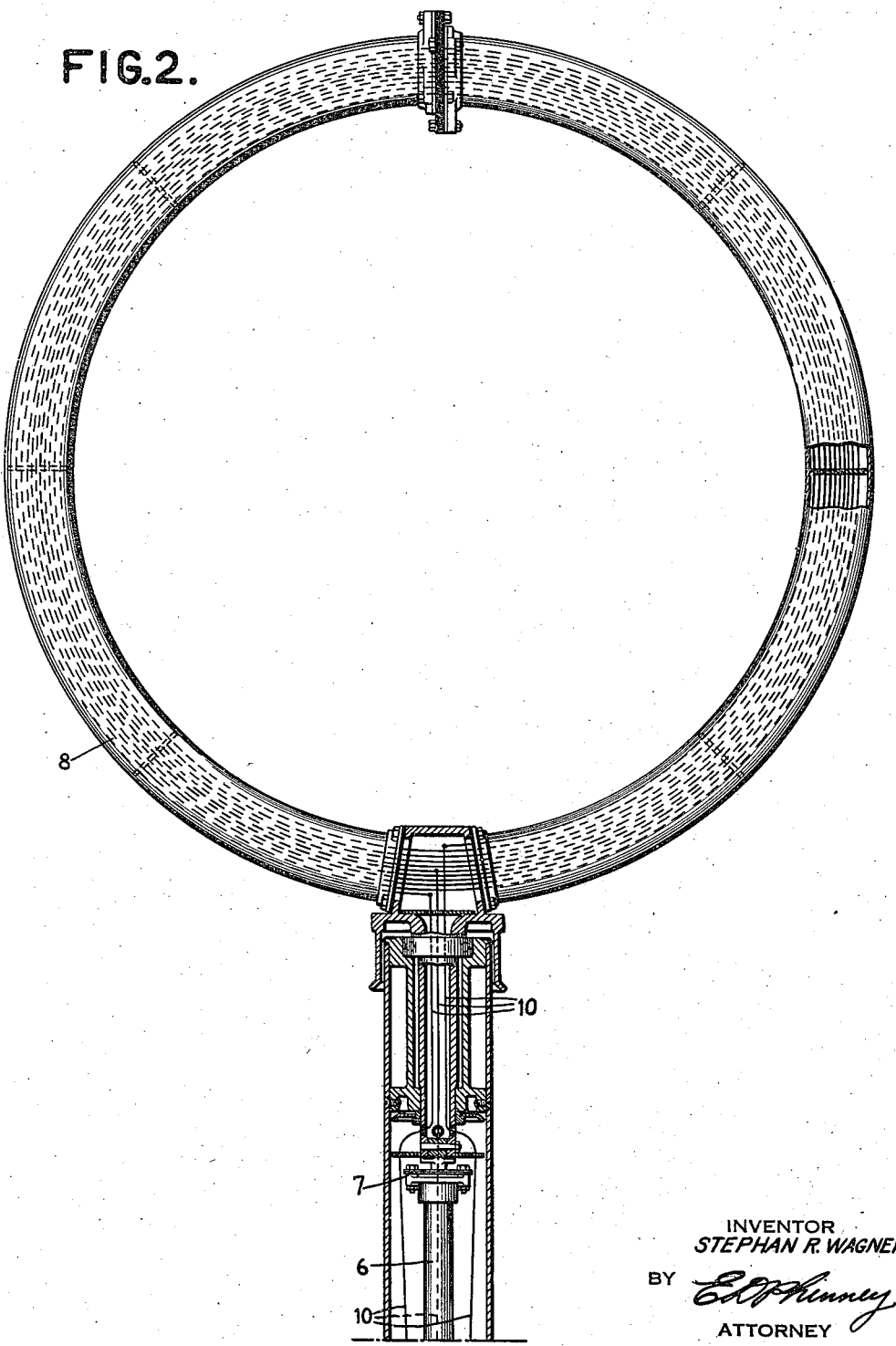

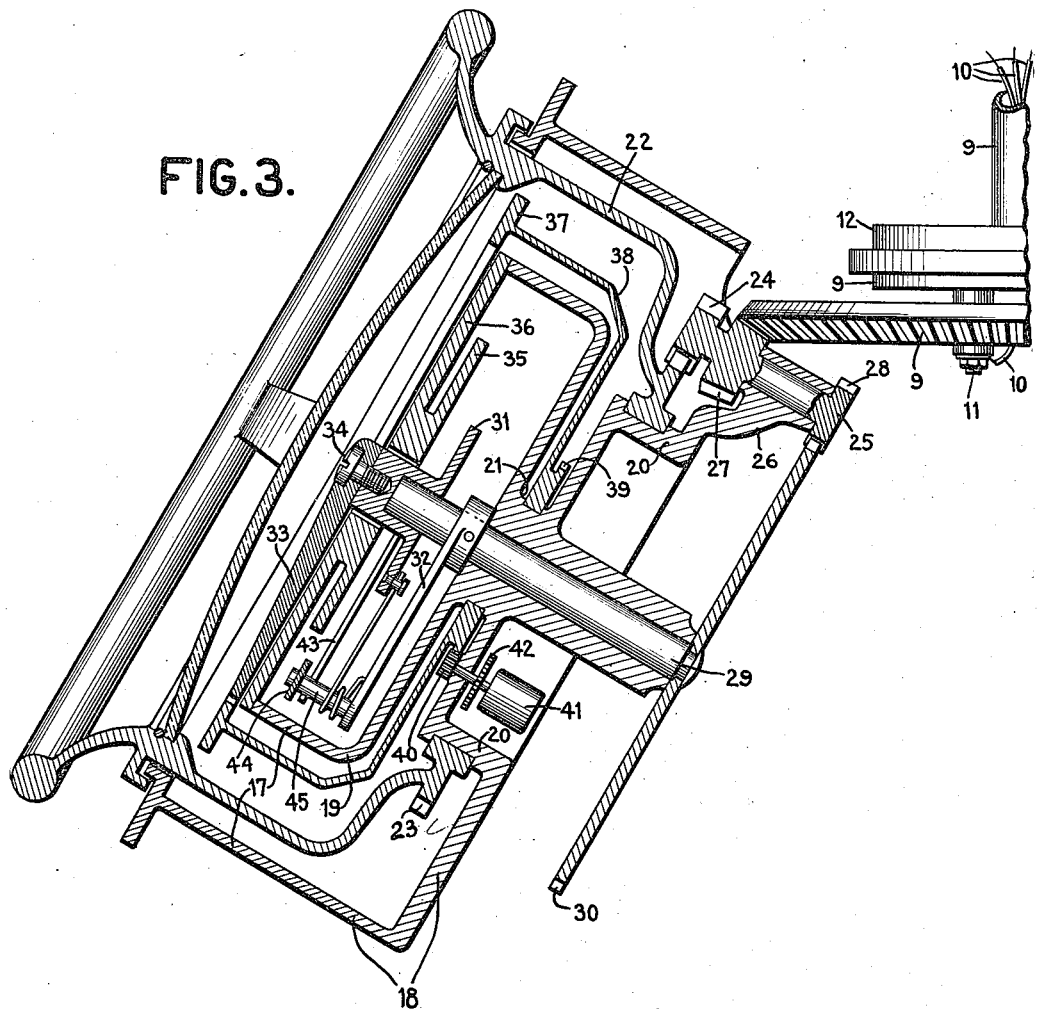
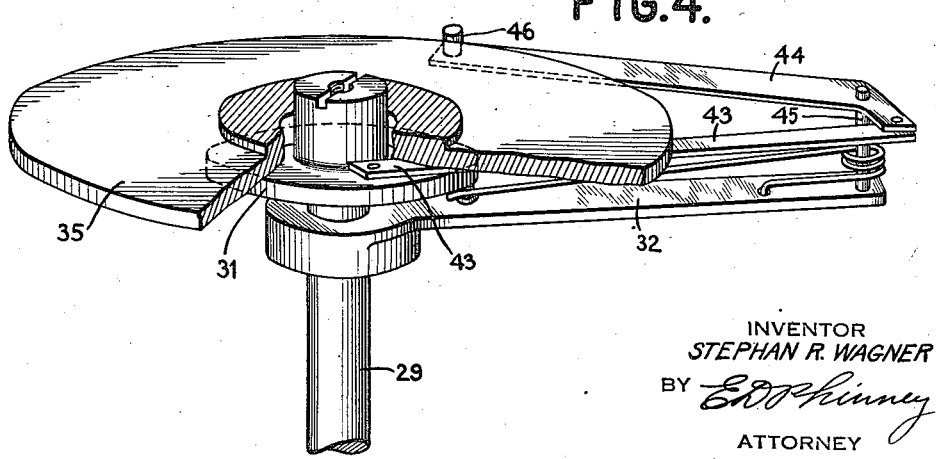

Patented Aug. 1, 1939

2,167,787

UNITED STATES PATENT OFFICE 2,167,787

RADIO DIRECTION FINDER

Stephan R. Wagner, Elizabeth, N. J., assignor to Federal Telegraph Company, Newark, N. J., a corporation of California Application June 15, 1937, Serial No. 148,278

12 Claims. (Cl. 250—11)

The present invention relates to radio compasses or direction finders especially for use on ships, and more particularly to the type of compass in which a loop or directional antenna is rotated under manual control into alignment with the direction of a received radio signal, and in which after such an alignment of the antenna an indicating device is adapted to show the bearing of the radio signal either with respect to the ship or with respect to the cardinal geographic directions such as true north or magnetic north, etc. The first mentioned bearing may be known as the off-bow bearing and the second mentioned as the absolute bearing.

It is an object of the present invention to provide a simple self-contained unitary structure which shall enable bearings of either the off-bow type or absolute type to be taken accurately and conveniently. It is a further object to provide such a compass in which the manual control for rotating the loop antenna is in the form of a handwheel and in which the essential visual indicating equipment for taking bearings of either type is located in the center of such handwheel and disposed in such a manner that the relationship of the cardinal geographic directions, the direction of the keel of the ship, and the direction of the received radio beam can be readily observed and easily visualized by an observer who is operating the handwheel with both hands.

It is a particular object of the present invention to arrange the visual indicating means in the form of two dials and one pointer concentrically rotatable with regard not only to one another but also with regard to the handwheel which surrounds them and to provide driving means for these four concentric mechanisms, that is the handwheel, outer dial, inner dial and pointer, which shall be disposed wholly behind these mechanisms so that the front side of the controlling and indicating panel of the compass shall be free from shafts, gears, or other supporting or driving mechanisms, and so that the indicating devices may be wholly visible at all times.

It is a further object to provide a rugged and reliable mechanism as above described in which the mechanical errors due to lost motion, friction or springing of the parts shall be reduced to a minimum. It is a further specific object of the present invention to provide a mechanism for supporting and driving these concentric indicating devices inside of and concentric with a controlling handwheel in such manner that the whole arrangement may be readily manufactured and maintained. For this purpose the four coaxially rotatable control and indicating devices are constructed in one separable unit in which are included all the necessary gears for driving the various indicating devices from the handwheel or from other control means, and the engagement between this unit and the other portions of the radio compass such as the shaft which rotates the loop antenna is so arranged that the unit may be readily removed from the compass or replaced therein.

According to another feature of the present invention a quadrature compensating mechanism which comprises a light sheet metal cam and a link motion made of comparatively light parts and which is to be located immediately adjacent the pointer of the indicating mechanism so as to avoid injury to such compensating mechanism, is for this purpose mounted inside of a stationary bowl or basket which carries the inner dial. This stationary bowl or basket is in turn enclosed by a second basket which carries the second dial, which again is enclosed by a third basket or spider framework supporting the handwheel. According to a further feature of the present invention the compensating mechanism is arranged so as to be readily accessible for repair or adjustment and the cam of this compensating mechanism is arranged to be readily accessible for removal from the front face of the control and indicating panel.

Figure 5:
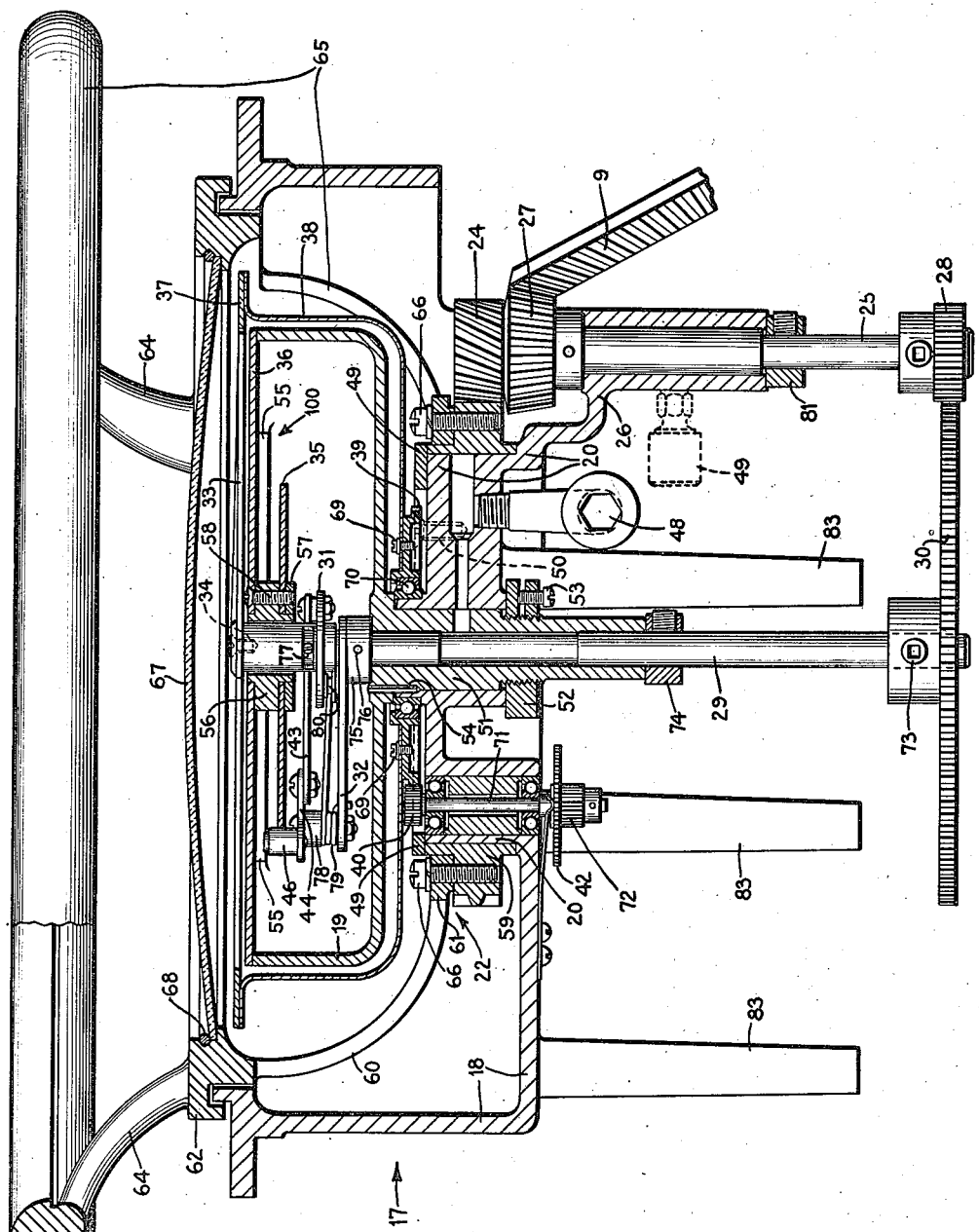

The invention may best be understood from the accompanying drawings in which, Fig. 1 is a side elevation partly in section of the lower part of a radio compass in accordance with the present invention; Fig. 2 is a sectional elevation of the upper part of the compass including the loop antenna; Fig. 3 is a somewhat schematic sectional elevation of the control and indicating unit generally shown as 15 in Fig. 1; Fig. 4 is a somewhat schematic perspective of the compensating mechanism shown in Fig. 3; and Fig. 5 is a more detailed sectional elevation showing the preferred construction of the unit schematically represented in Figs. 3 and 4.

In these drawings, and especially in Figs. 3 and 4, many of the sub-assemblies of members have been schematically represented as if they were formed of one single piece, even though in some instances the assembly of the device would be impossible or impracticable if the sub-assemblies were actually constructed of one pieces as shown. This schematic showing has been employed in order to facilitate the comprehension of the structure and operation of the present invention and it will be understood that in the actual construction of the invention many of these members which are shown as one single piece will actually be built up of a number of separate members rigidly fixed together by suitable means, and that each of these composite members may comprise several different materials.

Referring more specifically to Figs. 1 and 2 an aluminum cabinet 1 of which the lower portion is made of sheet aluminum and the upper portion is a casting, supports an aluminum receiver panel 2 which has an inclined face. On this panel 2 is mounted a receiving set 3 which is adapted to be energized by signals from a loop antenna 8 and to deliver an audible indication of the correct alignment of this loop by means of loud speaker 4, which is mounted in the top of cabinet 1 or alternatively by means of earphones (not shown), which may be plugged into a jack in the receiver panel 2. A storm door 5 covers the receiver panel when the instrument is not in use.

The loop antenna 8 is adapted to be rotated by means of coupling ring 7 from the shaft 6, which is in turn coupled by another flexible coupling ring 7' to the upper portion of rotary gear member 9. Electrical connection with the antenna is obtained over the three wires 10 which are brought down outside of shaft 6 so as to minimize distributed capacity and which then pass for a short distance inside of member 9 and are joined to terminal studs 11. These terminal studs are connected to slip rings 12, and in fact are shown integral therewith. Brushes 13 rest against these slips rings 12 to collect the signal from the antenna and these brushes 13 are connected by leads 14 to the input of receiver 3. The output of receiver 3 is connected by other leads (not shown) to loud speaker 4 and to a jack adapted to receive signals, (not shown). The upper front face of cabinet 1 is sloped to form a control and indicating panel and in this panel is set the control and indicating unit 15 which engages with and drives the rotary gear member 9 as explained hereafter. A clamping or braking member 16 is provided which bears upon a portion of rotary gear member 9 in order to lock the loop in any position to which it has been set or to introduce the desired resistance to rotation so that the loop may be more readily controlled in windy weather.

The construction and operation of control and indicating unit 15 may be more clearly seen from Fig. 3 which represents this unit in section. As shown in Fig. 3 the stationary frame 17 of the control and indicating unit is shaped so as to define a substantially annular cavity open to the front face of the unit. This frame 17 may be considered as comprising essentially a drum shaped chamber 18 open at the front face and provided with a flange for mounting it in the cabinet 1, the rear face of this drum shaped chamber being formed with a reentrant hollow central boss 19, 20, which extends forward from the rear face of the drum shaped chamber almost up to the plane of the open front face of this chamber. The hollow central boss 19, 20 is sharply reduced in diameter so as to form a narrow neck 21 which divides the boss into an open rear portion 20 of cylindrical shape and a closed front portion 19, which serves to house the compensator mechanism later described, and which will be hereinafter referred to as the compensator housing.

Hand wheel assembly 22 is rotatably mounted on the outer cylindrical bearing surface of the rear portion 20 of the central boss. Hand wheel assembly 22 comprises a ring gear portion 23 which is located directly in line with the bearing surface upon which the hand wheel is supported so as to insure an accurate and very rigid positioning of this gear. Spur gear 24 which meshes with this ring gear 23 is mounted on a jack-shaft 25 which is journaled in an extension 26 of frame 17. Preferably the extension 26 of frame 17 and the rear portion 20 of the central boss of this frame are cast in one unitary piece so that gear 24 will be rigidly and accurately located with respect to gear 23. On the same jack-shaft 25 is fixed a bevel gear 27 which meshes with antenna gear member 9, when the unit is in position in the cabinet 1. Also fixed to this jack-shaft 25 is another spur gear 28 for driving the indicator mechanism when the handwheel is rotated.

Inside of the central boss 19, 20 is the main indicator shaft 29 which extends from inside the compensator housing through the narrow neck portion 21 and the lower portion 20 to the rear side of main frame 17. This main indicator shaft 29 is journaled in the stationary frame member 17 as shown and carries a spur gear 30 which meshes with spur gear 28 so as to cause the rotation of shaft 29 when the hand wheel 22 is rotated. Preferably the pitch diameter of gear 30 is the same as the pitch diameter of ring gear 23, and the pitch diameters of spur gears 24 and 28 are equal, so that the main indicator shaft 29 will rotate in synchronism with hand wheel 22. If desired, however, these gear ratios may be modified to introduce a reduction between the rotation of hand wheel assembly 22 and the rotation of main indicator shaft 29. Pointer cap 31 is rotatably mounted on the front end of the main indicator shaft 29 and extends through the front face of compensator housing 19. Cap 31 is driven from the main compensator arm 32, which is fixed to shaft 29, by means of the compensator linkage more clearly shown in Fig. 3.

As described more fully hereafter, this compensator linkage drives cap 31 essentially in unison with shaft 29 except for a lagging or leading rotary displacement of a portion of a quadrant which may be introduced by the non-circularity of cam 35. Cap 31, therefore, rotates with shaft 29 and is essentially fixed with respect thereto, except for a rotary displacement of plus or minus a part of the quadrant. A pointer 33 is attached by screw 34 to the cap 31 so as to rotate over the face of front wall 36 of the compensator housing 19. This front wall 36 which supports cam 35 is preferably removable from the rest of housing 19 and on its front face is suitably engraved to serve as a dial. This member 36 is hereafter called the off-bow dial. Concentrically located just outside of this off-bow dial 36 there is disposed the absolute dial 37 whose front face is suitably engraved to designate the cardinal geographic directions, i. e. the bearings with respect to true north.

This dial 37 is carried by a basket member 38 which is journaled on an outer cylindrical surface of neck 21 of the central boss 19, 20. Basket member 38 comprises a ring gear portion 39 disposed directly opposite the bearing surface which supports this basket member, so as to insure accuracy and rigidity of positioning of the gear. Gear 39 meshes with another gear 40 which is driven from a special drive mechanism 41. This special drive mechanism 41 is of the type commercially marketed under the name "Sperry compass repeater mechanism" and is adapted to drive gear 40 in such manner that gear 39 and absolute dial 37 are maintained in a position corresponding to the position of a master compass located elsewhere on the ship at all times when said drive mechanism 41 is connected to said master compass. The details of the drive mechanism 41 form no part of the present invention and, since mechanism of this type are well known, need not be further described. It may be noted, however, that even if drive 41 is disassociated from the master compass for the purpose of adjusting dial 37 manually, and is then reassociated with the master compass, this drive 41 will immediately rotate gear 40 so as to bring gear 39 and dial 37 into correspondence with the master compass even if the master compass or the drive mechanism 41 or both have been altered in position between the time of their disassociation and the time of their reconnection. Gear 40 is also adapted to be rotated manually by means of a crown gear (not shown) which meshes with another gear 42 fixed to gear 40. Normally this crown gear is disengaged from gear 42 but may be engaged manually after disassociating drive mechanism 41 from the master compass. Dial 37 is therefore normally rotated under the control of the master compass by means of drive mechanism 41 but may alternatively be controlled manually.

It will thus be seen that the indicating and control unit provides a rotatable pointer 33 adapted to be read in connection with either the central off-bow dial 36 or the outer absolute dial 37, both of these dials, as well as the pointer being located centrally inside of the control hand wheel 22. The off-bow dial 36 is fixed and the outer dial 37 is adjustable in conformity with the manual or automatic adjusting means above described. Thus, when pointer 33 indicates against dial 36 a given bearing with respect to the keel of the ship, this pointer 33 will simultaneously indicate against dial 37 the corresponding direction with respect to the absolute north and south.

As previously mentioned, gear 27 meshes with antenna gear member 9 when the control and indicating unit is in position in the cabinet. The gear ratio between the gear portion of member 9 and the bevel gear 27 on jack shaft 25 is exactly the same as the gear ratio between the gears 30 and 28. This gear member 9 directly drives the loop antenna by means of flexible coupling ring 7 and drive shaft 6, therefore, the rotation of shaft 29 exactly corresponds to the rotation of the loop antenna at all times. In the preferred form of my invention the rotation of hand wheel 22 also corresponds to the rotation of shaft 29 and to the rotation of the loop antenna; but even if a reduction is introduced between hand wheel member 22 and indicating shaft 29, the gear ratio between gear member 9 and shaft 29 must not be altered but must always be equal to unity.

It is clear from the above that if the direction of the loop could be considered as accurately representing the direction of the incoming radio signal, the pointer 33 could be directly and rigidly connected to indicating shaft 29. It is known however, that the direction of reception of a signal with respect to the bow of the ship will not exactly correspond to the setting of the loop antenna with respect to the bow of the ship because of the influence of metal portions of the ship upon the incoming signal. The deviation is constant for any given relationship of the loop antenna to the ship and can be predetermined. Cam 35 is, therefore, suitably cut in accordance with this deviation so that, in a manner later described, it displaces cap 31 with respect to shaft 29 by the same number of degrees as the incoming signal is displaced with respect to the loop antenna. Therefore, since the direction of the loop antenna corresponds exactly to the direction of shaft 29 and since the deviation of the signal with respect to the loop antenna is exactly compensated by the displacement of cap 31 with respect to shaft 29, cap 31 which carries the pointer will at all times when the loop is adjusted for minimum reception, bear the same relationship to dial 36 as the direction of the incoming signal bears to the keel line of the ship.

From the above analysis it is evident that off-bow bearings can be directly taken by reading the position of the pointer against dial 36. Absolute bearings are equally directly indicated. As previously explained dial 37 is maintained by means of the automatic or manual adjustment in such a position that the bow position or zero point in the scale of dial 36 will bear the same relation with respect to the North graduation on dial 37 as the bow of the ship actually bears with respect to the true north direction. Therefore, the relationship of pointer 33 to dial 37 will indicate directly the direction of the signal with respect to the true north when the loop is set for minimum reception. Thus, as soon as the loop has been adjusted by means of the hand wheel to give the least signal, both the off-bow and absolute bearings of the signals are directly indicated by the position of the pointer with respect to the two dials.

By this arrangement not only are the bearings of the signals with respect to the ship and to the true north readily observable, but also the relationship of the three factors may be readily visualized and understood since the outer card may be considered as representing a map of the sea upon which the ship is sailing; the inner dial may be considered as representing the ship itself and the pointer may be considered as representing the true direction of the signals. It has been briefly mentioned that the cutting of cam 35 serves to displace pointer cap 31 with respect to indicating shaft 29 so as to compensate for the deviation of the loop direction with respect to the two directions of the signal. The link motion by which this displacement of cap 31 is effected under the control of cam 35, is clearly shown in Fig. 4. Bell crank arm 44 is pivoted on pin 45 and thus is carried around in unison with indicating shaft 29 since the pin 45 is rigidly fixed in arm 32 which is integral with or fixed with respect to the indicating shaft 29. Pointer cap 31 is connected to bell crank 44 by means of link 43 and thus this cap also rotates with shaft 29 so long as crank arm 44 does not rock around the pivot pin 45. The rocking of crank 44 around its pivot pin 45 is determined by the fact that a roller 46 on one end of this crank arm bears against the stationary cam 35. Thus, if cam 35 is circular crank 44 will not rock on pin 45; and thus the cap 31 will rotate exactly in unison with shaft 29. Any deviation from circularity of cam 35 will cause a corresponding displacement in a lagging or leading direction of cap 31 with respect to shaft 29. The surface of cam 35 is suitably graduated so that this cam may readily be cut to effect the necessary lagging or leading corrections. It is thus necessary only to observe and record the errors or deviations of the signal with respect to the loop at small intervals of rotation of the loop. Then from this data cam 35 can be immediately cut by the aid of the graduations on its face, so as to completely correct for these deviations.

The preferred practical embodiment of the arrangement schematically represented in Fig. 3, is shown in greater detail in Fig. 5. As shown in this figure, the frame structure designated generally by reference numeral 17, comprises a substantially drum-shaped aluminum casting 18 having a central reentrant boss 20 to which a bearing ring 49 is attached by screws 50 and a substantially basket-shaped brass casting 19 having a central quill portion 51. This quill fits tightly in a corresponding central hole in boss portion 20 of casting 18 and is secured by a split clamping nut 52 which is threaded upon the quill and which is locked by screw 53. A key pin 54 serves to register basket 19 in the correct angular relation with respect to frame 18 and to prevent relative rotation of these two parts. For lubrication there are provided a grease cup 48 which supplies lubrication to the outside cylindrical surface of boss 20 as well as to a cylindrical bearing surface inside of quill 51, and another grease cup 49 which lubricates a cylindrical bearing surface that is formed inside of extension 26 of casting 18. The dial and cam assembly 100, which may also be considered as part of the frame structure, comprises a dial plate 36 having on its front face a representation of the structure in which the direction finder is to be used, for example a ship or other vessel, and suitable graduations to facilitate the reading of "off dial" bearings as described in connection with the previous figures. This dial plate 36 is screwed to lugs 55 of basket member 19. Supported from dial plate 36 is cam plate 35 which is spaced from the dial plate by spacer 56 and held in position between this spacer and clamping ring 57 by screws 58 which extend through the dial plate, spacing member and cam plate, and are threaded into the clamping ring. All the above mentioned portions of the control and indicating unit are fixed with respect to one another during operation, and are collectively referred to as the frame structure, being designated generally by the reference numeral 17.

Handwheel assembly 22 comprises a ring gear 59 journaled on the outer cylindrical surface of boss 20 and retained by bearing ring 49. To this ring gear 59 is screwed the handwheel casting 65. Handwheel casting 65 comprises an inner ring portion 61 which is attached to ring gear 59 by screws 66, a basket-formed set of spokes 60, and intermediate ring portion 62, a set of three handwheel spokes 64, and a handwheel portion 63. The intermediate ring portion 62 of this handwheel casting 65 is formed with a depending flange and a groove which cooperate with a flange on the upper edge of casting 18 of the frame structure, thus forming a seal of the labyrinth type for excluding moisture and dirt. The intermediate ring portion 62 of the handwheel casting 65 does not, however, touch the casting 18 of the frame structure, but this handwheel casting 65 is wholly supported by the ring gear 59. A glass dial cover 67 is carried by intermediate ring portion 62 of the handwheel casting, being retained in position by snap ring 68.

Inside of handwheel casting 65 but outside of the basket-shaped member 19 of the frame structure, an intermediate basket-shaped member 38 of non-ferrous sheet metal is rotatably arranged. This intermediate basket-shaped member 38 is secured by screws 69 to a light weight gear member 39 which is in turn attached by press fitting to the outer surface of ball bearing assembly 70. The inner race member of this ball bearing 70 is seated as shown on a suitable neck portion of the reentrant boss 20, and is held in position by a shoulder on quill 51 of basket-shaped casting 19 of the frame structure. The front edge of intermediate basket member 38 is outwardly flanged and carries a ring-shaped dial 37 whose front face is suitably engraved for reading "absolute" bearings, as previously described in connection with Fig. 3. A shaft 71 extends through central reentrant boss 20 and is supported therefrom by ball bearings as shown. Pinion 40 is fixed to this shaft 71 and disposed so as to engage with the teeth of gear 39. Fixed to the inner end of shaft 71 is a pinion 72 which is adapted to engage with a gear on the "Sperry compass repeater mechanism" 41 (not shown in Fig. 5). Also fixed to shaft 71 is another gear 42 which is adapted to be engaged by a crown gear (not shown) in order to permit manual rotation of dial 37.

Through the center of quill 51 extends the main indicator shaft 29 which is rotatably journaled upon an inside bearing surface of this quill. On the rear or inner end of this shaft 29, a spur gear 30 is fixed by means of set-screw 73. End motion of shaft 29 is restrained by set-screw collar 74 which bears on the end of quill 51 and by the hub portion 75 of compensator arm 32, this hub being also pinned to shaft 29 by a taper pin 76. On the front or outer end of shaft 29 is rotatably journaled pointer cap 31 to which pointer 33 is attached by screw 34. End motion of this cap 31 is restrained by screw 77 which is threaded into shaft 29 and engages a slot in cap 31 as shown in the drawings. The slot in cap 31 is sufficiently long so that this cap may be rotated approximately 25 degrees in either direction from its normal position on shaft 29. The compensator linkages for controlling the displacement of cap 31 on shaft 29 are essentially as shown in Fig. 4. Bell crank arm 44 rotatably pivoted on a reduced neck portion of collar 78 carries a roller 46 rotatably held by a shouldered rivet at the end of its longer arm. At the end of the shorter arm of this bell crank 44, link 43 is pivotally connected by means of a screw and nut and a bearing collar to prevent binding. The other end of link 43 is similarly pivotally connected to the flange of cap 31 at such a point that the distance from the center of shaft 29 to the pivot point on the flange of cap 31 is equal in length and parallel to the distance from the bearing of bell crank arm 44 on collar 78 to the pivotal connection between this bell crank arm 44 and link 43. The rotation of cap 31 around shaft 29 is therefore always exactly equal to the rotation of bell crank arm 44 around its bearing collar 78. A spring 79 is positioned around the lower reduced neck portion of collar 78 and one end of this spring is hooked through a hole in arm 32. The free end of spring 79 bears against a flanged pin 80 fixed in the lower surface of the flange of cap 31, so that this spring 79 tends to rotate the cap counterclockwise, as viewed from the front of the control and indicating unit. By the action of this spring, therefore, roller 46 is pressed inwardly against the edge of cam plate 35. As explained in connection with Fig. 4, this cam 35 is suitably cut so that cap 31 and pointer 33 will be displaced with respect to shaft 29 by the same number of degrees as the true direction of the incoming signal is displaced with respect to the apparent direction to which the loop antenna must be set for minimum reception.

For the purpose of rotating antenna gear 9 in the proper direction with respect to handwheel 63, a jack shaft 25 is provided journaled in extension 26 of the casting 18 of the frame structure. This jack shaft is restrained from endwise motion by set-screw collar 81 and by the hub of bevel gear 27 which is pinned to this jack shaft by a taper pin. On the front end of this jack shaft is fixed a helical gear 24 which meshes with ring gear 59, the latter also being helically cut. On the rear end of jack shaft 25 is fixed a spur gear 28 which meshes with the spur gear 30 previously described. Spur gear 28 and helical gear 24 are of the same pitch diameter; also, helical ring gear 59 and spur gear 30 are of the same pitch diameter, so that shaft 29 is rotated synchronously with handwheel 63. The gear reduction ratio between bevel gear 27 and antenna gear 9 is equal to the reduction between spur gear 28 and spur gear 30, so that the antenna is rotated through the same number of degrees as indicator shaft 29, both of these rotations being the same as the rotation of handwheel 63.

The drum-shaped casting 18 of the frame structure is machined so as to fit accurately into the front panel of the complete direction finder cabinet, so that the control and indicating unit will align itself accurately with respect to this cabinet. This insures that bevel gear 27 will mesh properly with antenna gear member 9 when the control and indicating unit is inserted in the panel. The engagement between the latter two gears, 27 and 9, is the only mechanical engagement in which accuracy is essential, which must be effected when the control and indicating unit is placed in the direction finder cabinet. The only other mechanical engagement which must be effected between this unit and the remainder of the direction finder, is an engagement between a control knob on the side of the cabinet (not shown) and the shaft which carries the previously mentioned crown gear for engaging gear 42. All other gearing, such as the gear train for inter-relating the rotation of shaft 29 and the rotation of the handwheel as well as the gear train for rotating dial 37 from driving mechanism 41, remains in engagement when the unit is removed from the direction finder. For this purpose the "Sperry compass repeater mechanism" 41 is mounted upon legs 83 of casting 18 of the frame structure, so that this driving mechanism 41 remains fixed to the control and indicating unit when this unit is removed from the radio direction finder.

It is preferred to use non-ferrous metals for every portion of the unit except in the "Sperry repeater mechanism". If this mechanism is omitted the complete unit will be non-magnetic. In the whole direction finder, moreover, non-ferrous metals are employed except in the loud speaker 4 and in those portions of the receiver 3 which require iron.

It will be noted that in every embodiment of my invention, all the rotating parts with the exception of pointer cap 31 are mounted directly upon the stationary frame structure so that there are no forces tending to rotate any of these parts except the desired forces which are intended to control such rotation. Even basket member 38, for example, although it is located inside of the rotating member 65 and outside of the rotating shaft 29, is carried directly from the stationary frame structure. It has been found that such a construction greatly decreases the errors which may result from lost motion or springing of parts when a member is supported from another rotatable member intended to rotate separately and independently.

It will also be noted that in this preferred embodiment of my invention, the quadrature compensating mechanism is located immediately adjacent the pointer, so that it is impossible to apply forces for straining or bending this delicate mechanism except by actually removing the glass dial and extending force upon the pointer itself. By this arrangement the possibility of straining the compensator mechanism and thereby destroying its accuracy is almost eliminated since it is very unlikely that large stresses will be applied to the pointer and since, in any case, the pointer is sufficiently fragile so that excessive stresses can not be tranmitted through it. It should furthermore be noted, that the cam plate 35 is readily accessible for changing or recutting, since this cam can be removed without even taking the control and indicating unit out of the radio direction finder cabinet. In order to remove this cam plate 35, it is merely necessary to snap out spring ring 68 and remove the glass dial 67, and then to take out the screws which attach dial plate 36 to lug 55. Now by loosening the single screw 34, pointer 33 may be removed and then the complete assembly 100 which includes the dial plate 36 and the cam 35 may be taken out of the compass. For minor alterations in the surface of cam 35 it is not even necessary to detach this cam from the dial plate 36; for more extensive alterations or when it is desired to replace cam 35 by another cam, it is merely necessary to remove screws 58 and thus readily take the cam away from the dial plate.

While I have described the particular embodiments of my invention for the purposes of illustration, it should be understood that various modifications and adaptations thereof occurring to one skilled in the art, may be made within the spirit of the invention, as set forth in the appended claims.

What is claimed is:

1. In a radio signal direction finder of the type wherein by manually setting an antenna to a desired relationship with a signal an indicator is caused to indicate the bearings of the signal, a control and indicating mechanism comprising a stationary frame member, a handwheel rotatably mounted on said frame member and geared to the antenna, a pointer carried by a shaft which is driven by said handwheel and is rotatably mounted and encompassed during rotation by said handwheel, and two concentric dials of which one is rotatably mounted on said frame member outside of said shaft and inside of said handwheel.

2. In a radio signal direction finder for use on a movable ship, the finder having a directional antenna and being of the type wherein by manually setting the antenna to a desired relationship with a signal an indicator is caused to indicate the bearings of the signal, a control and indicating mechanism comprising a stationary frame member, a handwheel rotatably mounted on said frame member and geared to the antenna, a pointer coupled to a shaft which is geared to said handwheel and is rotatably mounted on said frame member and encompassed by said handwheel, and two concentric dials of which one is rotatably mounted on said frame member outside of said pointer shaft and inside of said handwheel.

3. In a radio signal direction finder for use on a movable ship, the finder having a directional antenna and being of the type wherein by manually setting the antenna to a desired relationship with a signal an indicator is caused to indicate the bearings of the signal, a control and indicating mechanism comprising a stationary frame member, a handwheel rotatably mounted on said frame member and geared to the antenna, a pointer coupled to a shaft which is geared to said handwheel and is rotatably mounted on said frame member and encompassed during rotation by said handwheel, and two substantially planiform concentric dials mounted on said frame member outside of said pointer shaft and inside of said handwheel, one of said dials being graduated for reading bearings with respect to the ship and the other dial being rotatably mounted and being graduated for reading absolute bearings.

4. In a radio signal direction finder for use on a movable ship, the finder having a directional antenna and being of the type wherein by manually setting the antenna to a desired relationship with a signal an indicator is caused to indicate the bearings of the signal, a unitary control and indicating mechanism comprising a stationary frame member, a handwheel rotatably mounted on said frame member, a driving gear adapted to be rotated by said handwheel, a pointer carried by a shaft which is driven by said handwheel and is rotatably mounted on said frame member inside of said handwheel, two concentric dials of which one is rotatably mounted on said frame member outside of said pointer shaft and encompassed during rotation by said handwheel, said whole unitary mechanism being readily removable from the remainder of the direction finder, and a driven gear connected to rotate the directional antenna, said gear being adapted to engage the driving gear of the unitary mechanism when said mechanism is in place in the direction finder.

5. In a radio signal direction finder the combination of a frame, a handwheel rotatably mounted thereon, a directional antenna geared to said handwheel, a first dial rotatably mounted and encompassed during rotation by said handwheel, a second dial mounted inside said first dial, a pointer in front of said second dial and adapted to rotate in cooperative relation with the front faces of both of said dials, and a pointer-driving train of mechanism extending from the pointer rearwardly through said second dial to said handwheel whereby said pointer is rotated by said handwheel through said train.

6. In a radio signal direction finder a unit comprising a frame, a handwheel rotatably mounted thereon, a gear adapted to be rotated by said handwheel, a first dial rotatably mounted inside said handwheel, a second dial mounted so as to be encompassed by said first dial, a pointer in front of said second dial and adapted to rotate in cooperative relation with the front faces of both of said dials, a pointer-driving train of mechanism extending from the pointer rearwardly through said second dial to said handwheel whereby said pointer is rotated by said handwheel through said train, said unit being self-contained and readily removable from the rest of the direction finder, a second gear adapted to be engaged by the gear of said unit when the unit is in position in the direction finder and a directional antenna coupled to said second gear.

7. In a radio signal direction finder the combination of three concentrically nested basket-shaped members of which the outer two are rotatably mounted, a handwheel fixed to the outer member, a directional antenna geared to said outer member, a substantially planiform dial fixed to the intermediate member, a second substantially planiform dial fixed to the inner member, a pointer disposed in front of said second dial and adapted to rotate in cooperative relation with the front faces of both of said dials and a train of mechanism extending from said outer member through said intermediate and inner members and through said second dial to said pointer for rotating said pointer in response to the rotation of said handwheel.

8. In a radio signal direction finder the combination of three concentrically nested basket-shaped members of which the outer two are rotatably mounted, a handwheel fixed to the outer member, a directional antenna geared to said outer member, a substantially planiform dial fixed to the intermediate member, a second substantially planiform dial fixed to the inner member, a pointer disposed in front of said second dial and adapted to rotate in cooperative relation with the front faces of both of said dials and a train of mechanism extending from said outer member through said intermediate and inner members and through said second dial to said pointer for rotating said pointer in response to the rotation of said handwheel, said train of mechanism including a quadrature compensating device disposed within said inner basket-shaped member.

9. In a radio signal direction finder the combination of three concentrically nested basket-shaped members of which the outer two are rotatably mounted, a handwheel fixed to the outer member, a directional antenna geared to said outer member, a substantially planiform dial fixed to the intermediate member, a second substantially planiform dial fixed to the inner member, a pointer disposed in front of said second dial and adapted to rotate in cooperative relation with the front faces of both of said dials, a stub fixed to said pointer and extending through said second dial into the interior of said inner basket-shaped member, a shaft extending into the interior of said inner member, a gear train coupling said shaft to the outer member, a cam fixedly mounted within said inner member and means disposed within said inner member for rotating said stub under the joint control of said shaft and said cam.

10. A radio signal direction finder comprising a frame structure having a cavity and reentrant boss with an external cylindrical surface in said cavity, a control member journaled on said cylindrical surface and comprising a handwheel and a ring gear, a directional antenna mechanically coupled to said control member, a central shaft journaled in said reentrant boss, an indicating pointer driven by said shaft, and a train of gears adapted to drive said shaft responsive to the rotation of said ring gear.

11. In a control and indicating unit for a radio signal direction finder, a frame piece having a cavity and a hole in the bottom of said cavity, a substantially basket-shaped member having a quill portion adapted to fit in said hole, whereby said basket-shaped member is so positioned within said cavity as to define a substantially annular cavity, means for rigidly fixing said basket member to said frame piece in such relative position, a control member rotatably journaled within said annular cavity so formed, a rotatably mounted shaft extending into the interior of said basket member, a gear train for driving said shaft in response to the rotation of said control member, a handwheel fixed to said control member, a pointer disposed for rotation in front of said basket-shaped member and during rotation encompassed by said handwheel, a cam fixedly supported from said basket-shaped member and a quadrature compensating mechanism for driving said pointer from said shaft under the control of said cam.

12. In a radio signal direction finder, a frame piece having a cavity and a hole in the bottom of said cavity, a basket-shaped member having a quill adapted to fit in said hole, means including said quill and the surface of said hole for fixing said basket member rigidly with respect to said frame piece so as to constitute a rigid frame structure, a ring gear rotatably mounted utside of said basket-shaped member and inside of said frame piece, a handwheel fixed to said ring gear, a rotatably mounted shaft extending into the interior of said basket-shaped member, means for driving said shaft from said ring gear, a pointer rotatably mounted so as to be encompassed by said handwheel and a cam cntrolled compensating mechanism for driving said pointer from said shaft.

STEPHAN R. WAGNER.